3,418,148
DYE LAYER FOR CARBON PAPER, COPYING
PAPER, HECTOGRAPHIC PAPER, AND THE
LIKE, AND METHOD OF MAKING SAME
Günter Barz, Dusseldorf, Germany, assignor, by mesne
assignments, to Ancar A.G., Zug, Switzerland
Filed Jan. 6, 1965, Ser. No. 423,780
Claims priority, application Germany, Jan. 9, 1964,
B 74,924
2 Claims. (Cl. 117—36.1)

ABSTRACT OF THE DISCLOSURE

A dye transfer medium, as for instance copying paper, and method of making same, said transfer medium comprising a carrier paper and a polyethylene film having two spaced dye pigment-free outer layers of polyethylene with one of said outer layers bonded to said carrier paper, and an intermediate layer interposed between said outer layers and representing a mixture of polyethylene, oil, and a dye pigment. The said method comprises the steps of applying the above mixture to one side of said carrier paper, and passing the thus coated carrier paper on the non-coated side over a heated roller having a temperature of about 185° F.

---

The present invention relates to a dye pigment layer for carbon paper, hectographic paper, copying paper and the like composed of a mixture of synthetic material, oil and dye.

Carbon paper for use in typewriters, copying paper for handwriting and hectographic paper are produced by rubbing down dyestuffs, for instance dye pigments or soluble dyestuffs by means of a mixture of wax and oil, to a mixture which is liquid when hot, whereupon said last-mentioned mixture in molten condition is deposited on the paper or foil which is intended to carry the dye pigment layer, and subsequently the thus treated paper or foil is cooled. The quantity ratio of wax and oil is so selected that during the writing operation, more or less of the dyestuff-wax-oil mixture is given off to the paper producing a copy.

The drawback of coating papers, carbon papers, or the like produced in this way consists in that they are more or less smudging, depending on the selected hardness of the applied mixture. In order to develop papers which will have a minimum of smudging ability, recently papers have been produced in which synthetic materials form the layer which gives off the dye, said layer having dyestuffs embedded therein. In contrast to the customary carbon papers, the layer of which is applied thereto when in hot liquid condition, the layers of synthetic material are applied in dissolved condition, primarily when cold or only slightly warm.

It is, therefore, an object of the present invention to produce a dye-containing layer for carbon paper, copying paper, hectographic paper and the like which will practically not smudge at all.

It is another object of this invention to provide a dye-containing layer as set forth in the preceding paragraph in which said layer automatically forms a protective covering layer so that the heretofore necessary protective layer for covering the dye layer will be superfluous.

These and other objects and advantages of the invention will appear more clearly from the following specification in connection with the accompanying drawing, in which.

A dye layer according to the present invention, for carbon paper, copying paper, hectographic paper and the like which contains a mixture of synthetic material, oil and dyestuff is characterized in that polyethylene is selected as the synthetic material. Preferably, polyethylene with a molecular weight of from 1500 to 5000 is employed. Carbon paper, copying paper and hectographic paper or the dye layers thereof when produced in conformity with the present invention do for all practical purposes not smudge nor smear. For purposes of producing dye mixtures while employing polyethylene, aliphatic or chlorinated hydrocarbons are added to the mixture as solvent.

The dye layer according to the present invention may, depending on the quantity of polyethylene, be soft or hard or may be controlled so as to have a hardness therebetween without losing its non-smudging or non-smearing characteristic. On the other hand, the durability of the dye layer may be varied at random.

The employment of polyethylene in conformity with the present invention, especially with a molecular weight of from 1500 to 5000 as synthetic material within the synthetic material-oil-dyestuff mixture also brings about that in addition to said polyethylene forming an absorbing layer for the dyestuff-oil mixture, a covering layer of polyethylene is formed above and below the dye layer proper. As a result thereof, when employing polyethylene, the heretofore necessary application of a protective layer on the bottom side of the carbon paper, copying paper, hectographic paper or the like, becomes unnecessary. In addition thereto, the said protective layer formed by polyethylene above and below the dye layer brings about that with very absorbent dye carriers, a penetration of the dye to the front side will be safely prevented.

The die mixtures according to the present invention are, in conformity with methods known in connection with the production of carbon paper, applied to the paper or foil in warm liquid or cold condition with subsequent cooling or drying, while all papers and foils customarily employed heretofore for the production of carbon papers also may be employed in connection with the present invention.

A further important advantage of a dye layer according to the present invention consists in that it will on the back side of said layer not pass through the dye layer carrying paper and that dye papers or the like which heretofore had to be provided with a protective layer can now be employed without such protective layer while also such dye papers will, according to the present invention, have a surface which will not smudge or smear.

Figure 1:
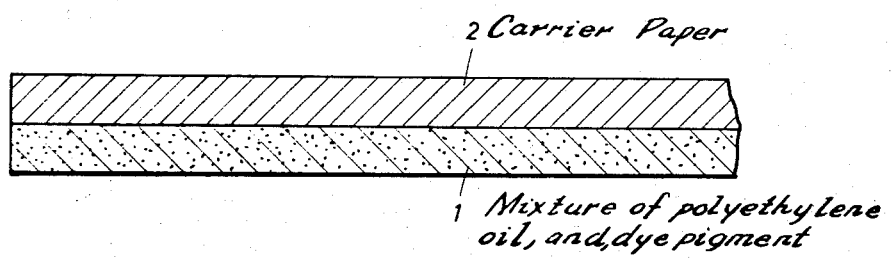
FIGURE 1 shows the dye layer after it has been applied to a dye carrier.
Figure 2:
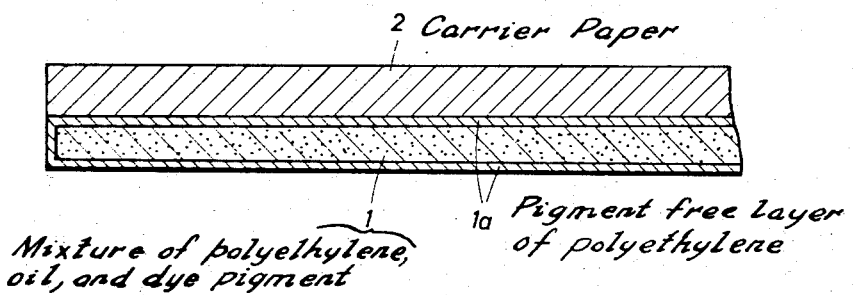
FIGURE 2 shows the same dye layer of FIGURE 1 but after it has cooled or dried.

FIG. 2 of the drawing shows that after the dye layer 1 has been applied to the dye carrier paper 2 in conformity with FIG. 1, when employing polyethylene as synthetic material, a polyethylene layer 1a forms above and below the layer 1 containing the dye mixture so that a penetration of the dye mixture onto the dye carrier 2 or a giving off of dye at the bottom side of the carbon paper, copying paper, hectographic paper or the like, will be prevented.

A dye mixture according to the invention when applied to carbon paper, copying paper, hectographic paper and the like may contain, for instance, the following ingredients:

from 5 to 35 parts of polyethylene of a molecular weight of from 1500 to 5000;
from 5 to 20 parts of dyestuff;
from 5 to 35 parts of non-drying oils; and
from 40 to 100 parts of aliphatic chlorinated hydrocarbons.

The above parts are meant as parts by weight.

The following mixtures are two examples of the invention:

Mixture I

| | Parts by wt. |
|---|---|
| Polyethylene | 25 |
| Dyestuff | 10 |
| Non-drying oils | 20 |
| Aliphatic chlorinated hydrocarbons | 250 | and

Mixture II

| | Parts by wt. |
|---|---|
| Polyethylene | 10 |
| Dyestuff | 10 |
| Non-drying oils | 25 |
| Aliphatic chlorinated hydrocarbons | 200 | and

As dyestuff may be used: soot, milori-blue, carbon-violet and heliogen-true-blue.

Oils are for instance: neat's-foot oil and bone-oil.

Two of hydrocarbons are: perchlorethylene and tetrachlor-carbon.

By the method of producing the mixture the dyestuffs and oils are mixed. The polyethylene is dissolved in a chlorinated hydrocarbon at about 185° F. If this solution is perfectly clear the dyestuff-oil mixture is added and by means of an agitator is mixed homogeneously over a period of 5 minutes at 1500 r.p.m. of said agitator.

According to a second method, the polyethylene is dissolved in a chlorinated hydrocarbon at about 185° F., the oils and dyestuffs are added to the clear solution and dispersed by an agitator over a period of 15 minutes at 1500 r.p.m. of said agitator.

The mixture is further manufactured at 104° F. After applying the mixture to a carrier, the chlorinated hydrocarbon will be evaporated by a cold-air blast engine. Thereupon, the carrier is fed with the non-covered side to a roll which has a temperature of 185° F. This hot roll melts the polyethylene, and a layer of polyethylene is built up on both sides of the remaining mixture, closing up this colour—consisting mixture as well to the carrier as to the surface of the mixture.

It is, of course, to be understood that the present invention is, by no means, limited to the particular dye mixture and method as set forth above but also comprises any modifications within the scope of the appended claims.

What I claim is:

1. A method of producing a dye mixture carrying transfer medium, especially carbon paper, copying paper, and hectographic paper, which mixture includes synthetic material in the form of 5 to 35 parts by weight of polyethylene, 5 to 35 parts by weight of non-drying oils and 5 to 20 parts by weight of dyestuff, said method comprising the steps of: dissolving the polyethylene at a temperature sufficient to dissolve in 40 to 250 parts by weight of a chlorinated hydrocarbon, adding oil and dyestuff to the clear solution and thoroughly agitating said solution over a period of from 5 to 15 minutes to obtain an intimate mixture, applying the thus obtained mixture at a temperature of about 104° F. to one side of a transfer medium, evaporating the chlorinated hydrocarbon, and feeding the thus one side coated transfer medium on its non-coated side over a roller having a temperature of about 185° F. to segregate the dyestuff and oil within the coating and build up polyethylene substantially free of said dyestuff and oil on both surfaces of the mixture.

2. The transfer medium produced by the method of claim 1.

References Cited

UNITED STATES PATENTS

| | | | |
|---|---|---|---|
| 2,820,717 | 1/1958 | Newman et al. | 117—36.1 |
| 3,061,454 | 10/1962 | Graf et al. | 117—36.1 |
| 3,031,327 | 4/1962 | Newman | 117—36.4 |
| 3,337,361 | 8/1967 | La Count | 117—36.4 |

MURRAY KATZ, *Primary Examiner.*

U.S. Cl. X.R.

117—36.4, 155; 260—23